UNITED STATES PATENT OFFICE.

HERMAN C. BECKMAN AND GEORGE E. DYCK, OF CHICAGO, ILLINOIS.

PROCESS OF MAKING ARTIFICIAL CREAM.

1,216,052.  Specification of Letters Patent.  Patented Feb. 13, 1917.

No Drawing.  Application filed August 7, 1911. Serial No. 642,723.

*To all whom it may concern:*

Be it known that we, HERMAN C. BECKMAN and GEORGE E. DYCK, citizens of the United States, residing at Chicago, in the county of Cook and State of Illinois, have invented a certain new and useful Improvement in Processes of Making Artificial Cream, of which the following is a full, clear, concise, and exact description.

The object of our invention is to produce an artificial cream that may be used with economy as a substitute for natural cream in any of the uses to which cream is now put, and which has all the physical properties of natural cream.

A further object of our invention is to provide a food product which is readily digestible and at the same time highly nourishing and relatively free from germs. A further object of our invention is to produce a substitute for cream which may be sold at a less price than natural cream, and of which the supply is not subject to be curtailed. A further object of our invention is to produce a substitute for natural cream which may be preserved in sealed vessels for a considerable time without spoiling. An article fulfilling the objects above stated is produced by the process of our invention described in our copending case, Serial No. 631,791, filed June 7, 1911.

In manufacturing this article we take for example, beef fat or in lieu thereof, butter fat, together with either full milk, condensed milk, milk prepared with milk powder, or skim milk, and milk sugar or any other sugar or glucose, and lecithin, and these we combine in suitable manner, one satisfactory method of which we find to be as follows:

We melt the beef or butter fat, and then dissolve the lecithin in it, the lecithin being soluble in such fat. The milk sugar or other sugar is dissolved in the milk, in full milk or skim milk, whichever may be used. These two mixtures are then united, as for example by pouring both of them into a container provided with some suitable agitator and surrounded by a steam or hot water jacket, or having some other suitable agitating and heating arrangement. We find it desirable, although not essential to put the milk with the sugar dissolved in it into the container first and then heat that mixture, to start the agitator, and then pour in the fat solution with the lecithin dissolved in it, the same having previously been heated to bring it to a liquid state. Then the entire mixture is pasteurized and then emulsified. It is then taken out and cooled, preferably by running it through some suitable cooler or cooling apparatus. To this mixture after cooling we may though not necessarily, add a certain amount of calcium saccharate, commonly known in the trade as viscogen. The same effect is produced if sugar in excess of that needed for sweetening purposes is added to the mixture before or after pasteurization, and lime water added at the end of the process. However, the use of a particular thickening agent is not an essential feature of our process, as we may use any one of various agents to produce the result desired in this respect. For instance we have used besides calcium sucrate, rennet and other active ferments, gelatin, starch, gum tragacanth, gum arabic, Iceland moss, Irish moss, and carrageen moss. We have obtained good results also by merely oxidizing the produce after pasteurization by blowing through it air or air containing ozone. In the step of oxidizing the product we find that ozone possesses a remarkable efficiency and produces a superior article. We prefer, however, to use starch since it is efficient and unobjectionable from the standpoint of health. We find that the so-called thickening agents mentioned above serve not only to thicken the product, but also serve as binding or stabilizing agents, preventing the separation of the oil or fat from the milk base, except under unusual circumstances.

If desired we can add some ingredient which will serve as coloring matter, such ingredient being well known on the market. We can then, if desired, add other ingredients which are at times desirable to add. For instance we can add any one or more, or all of the following: cholesterol, phytosterol, or lipochrome. These are all natural ingredients of cream and will serve to give the product more of the properties of the natural article. These elements may be added either in addition to or in place of lecithin. They are desirably added prior to pasteurization.

If desired, we will also add, and these would also desirably be added prior to pasteurization, any one or more or all of the glycerids of the following acids, to-wit: acetic, butyric, caproic, caprylic, capric, lauric, myristic, palmitic, stearic, arachidic and oleic, the same being ingredients of natural cream.

The cream made by this process will be clean and pure, the whole having been pasteurized and the various elements having been inspected and purified as required by pure food laws, before they are used. It will be seen that all of the ingredients used with the exception of calcium saccharate or viscogen, are natural ingredients of cream, the viscogen being simply used as a thickener. The glycerid of butyric acid will serve to flavor the product, it being one of the natural flavoring elements. The cream is thoroughly wholesome and palatable and resembles natural cream very closely, and can be used in all the ways that natural cream can be, either as such, or by being manufactured into other products such as butter, ice cream and pastry and the like.

Having thus described our invention what we claim is:

1. The process of making artificial cream which consists in preparing a mixture of a fat base, a milk base, pasteurizing and emulsifying the whole, and adding a binding ingredient.

2. The process of making artificial cream which consists in preparing a mixture of fat and sugar dissolved in milk, heating and agitating the same, pasteurizing and emulsifying the whole, and adding a thickening ingredient.

3. The process of making artificial cream which consists in preparing a mixture of beef fat and sweetened milk, heating and agitating the same, adding one or more ingredients of natural cream, pasteurizing and emulsifying the whole, and then adding a thickening ingredient.

4. The process of making artificial cream which consists in preparing a mixture of an oleaginous substance and a milk base, pasteurizing and emulsifying the same and adding starch.

5. The process of making artificial cream which consists in preparing a mixture of a fat base, a milk base, lecithin, pasteurizing and emulsifying the whole, and adding starch.

6. The process of making artificial cream which consists in preparing a mixture of a fat base, a milk base, adding natural ingredients of cream, pasteurizing and emulsifying the whole, and adding a stabilizing ingredient.

7. The process of making artificial cream which consists in preparing a mixture of an oleaginous substance and whole milk, pasteurizing and emulsifying the same and adding starch.

8. In the process of making artificial cream, the step which consists in adding starch to prevent separation of the ingredients of the cream.

In witness whereof, we hereunto subscribe our names this 3rd day of August, A. D. 1911.

HERMAN C. BECKMAN.
GEORGE E. DYCK.

Witnesses:
A. LYDA JONES,
HAZEL JONES.